United States Patent
Biondich et al.

(10) Patent No.: US 9,625,570 B2
(45) Date of Patent: Apr. 18, 2017

(54) AUTOMATED MOBILE INVERTIBLE MEASUREMENT DEVICE

(71) Applicant: The Boeing Company, Chicago, IL (US)

(72) Inventors: Kyle S. Biondich, Bothell, WA (US); Truong D. Pham, Lynnwood, WA (US); Zachary Talus, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 277 days.

(21) Appl. No.: 14/506,846

(22) Filed: Oct. 6, 2014

(65) Prior Publication Data
US 2016/0097842 A1    Apr. 7, 2016

(51) Int. Cl.
| | |
|---|---|
| G01C 3/08 | (2006.01) |
| G01S 7/481 | (2006.01) |
| G01S 17/66 | (2006.01) |
| G05D 1/02 | (2006.01) |
| B64F 5/10 | (2017.01) |
| B64F 5/60 | (2017.01) |
| G01S 7/48 | (2006.01) |
| G01C 15/00 | (2006.01) |

(52) U.S. Cl.
CPC ............... *G01S 7/481* (2013.01); *B64F 5/10* (2017.01); *B64F 5/60* (2017.01); *G01S 17/66* (2013.01); *G05D 1/0236* (2013.01); *G05D 1/0255* (2013.01); *G01C 15/002* (2013.01); *G01S 7/4808* (2013.01); *G05D 2201/0207* (2013.01)

(58) Field of Classification Search
CPC .... B64F 5/0009; B64F 5/0045; G01C 15/002; G01S 7/481; G01S 17/66; G01S 7/4808; G05D 1/0236; G05D 1/0255; G05D 2201/0207
See application file for complete search history.

(56) References Cited

U.S. PATENT DOCUMENTS

| | | | | |
|---|---|---|---|---|
| 5,404,747 A | * | 4/1995 | Johnston | ................. G01M 3/24 73/40 |
| 5,963,660 A | * | 10/1999 | Koontz | ................. G01N 21/88 156/64 |
| 2007/0034313 A1 | * | 2/2007 | Engelbart | ............... B29C 70/32 156/64 |

* cited by examiner

*Primary Examiner* — Luke Ratcliffe
*Assistant Examiner* — Samantha K Abraham
(74) *Attorney, Agent, or Firm* — MH2 Technology Law Group LLP

(57) ABSTRACT

An apparatus is utilized for measuring a circumference. The apparatus includes a body section, and at least one wheel rotatably attached to the body section. Additionally, at least one vacuum generating device is disposed on the body section, and is configured to generate an effective amount of vacuum between the body section and an adjacent arcuate surface which is sufficient to retain the body section against the arcuate surface. At least one of a reflector and a gap detector may also be affixed to the body section.

20 Claims, 7 Drawing Sheets

AUTOMATED MOBILE INVERTIBLE MEASUREMENT DEVICE

FIELD

A mobile invertible measurement device and, more particularly, a robotic device configured to generate an effective amount of vacuum between itself and a surface sufficient to hold the robotic device against the surface as the device traverses the surface for measurement purposes.

BACKGROUND

When constructing an airplane fuselage, the fuselage is often assembled longitudinally from generally cylindrical sections of fuselage. These individual cylindrical fuselage sections are constructed from panels. For example, a fuselage section of a BOEING 777 is formed from four panels: a keel panel at the bottom, opposing side panels on either side, and a crown panel on top. As will be understood, when assembling these panels into a fuselage section, the circumference of the fuselage is very important. If a fuselage section is constructed with an incorrect circumference, it will not mate properly with adjacent sections.

Prior art assembly techniques for maintaining consistency of fuselage section circumference involved the use of a Floor Assembly Jig (FAJ). The FAJ was essentially a form around which the fuselage panels could be assembled, thereby ensuring correct circumferences. However, new assembly techniques have made the use of a FAJ obsolete. With the introduction of Fuselage Automated Upright Build (FAUB) techniques and devices for the 777, the fuselage is built without the use of a FAJ to help maintain circumference consistency.

Laser radars have been used to measure the circumference of an assembled fuselage section. However, this technique has several drawbacks. The setup time for the laser radar is approximately 4 hours. Additionally, the laser radar itself is heavy—generally more than 100 pounds—and its overall size reduces mobility. Additionally, the actual measurement period lasts thirty minutes or more. Thus, existing techniques are unwieldy and inefficient.

In addition, when constructing a fuselage section from various panels, or when constructing the fuselage from various fuselage sections, measurements other than circumference are important. For example, the longitudinal lap splice (i.e., gaps between the laps of each of the four panels along the length of a fuselage section) and circumferential splice areas (i.e., circumferential gaps between fuselage sections) are the integration zones between skin panels. These areas have strict engineering requirements that are important to the fatigue life of the airplane.

In the past, techniques for monitoring splice centered around manual validation. A worker would insert a tapered gauge into each gap at every frame bay and around the entire circumference of the fuselage. This technique is time consuming and difficult, considering the fuselage is constructed high above the ground with the introduction of FAUB. Indeed, the existing manual techniques require lengthy scaffolding moves to capture data high above the ground. Thus, existing validation techniques are undesirable for current FAUB construction methodologies.

SUMMARY

Some embodiments include an apparatus which comprises a body section, and at least one wheel rotatably attached to the body section. Additionally, at least one vacuum generating device is disposed on the body section, and is configured to generate an effective amount of vacuum between the body section and an adjacent arcuate surface which is sufficient to retain the body section against the arcuate surface. At least one of a reflector and a gap detector are also affixed to the body section.

Still other embodiments include a method for obtaining a fuselage circumference. The method includes the step of providing an apparatus including a body section, and at least one wheel rotatably attached to the body section. Additionally, at least one vacuum generating device is disposed on the body section, and is configured to generate an effective amount of vacuum between the body section and an adjacent arcuate surface which is sufficient to retain the body section against the arcuate surface. A reflector is also affixed to the body section. Next, a laser tracker is utilized to direct a laser tot the reflector of the apparatus. The laser is then directed to the reflector at a plurality of positions, and a reflection of the laser from the reflector is then detected and used to determine the position of the apparatus on the fuselage at the plurality of positions. The circumference of the fuselage is then determined based on the detected reflection at the plurality of positions.

Still other embodiments include a method for detecting a gap in a lap along a fuselage. The method includes the step of utilizing an apparatus including a body section, and at least one wheel rotatably attached to the body section. Additionally, at least one vacuum generating device is disposed on the body section, and is configured to generate an effective amount of vacuum between the body section and an adjacent arcuate surface which is sufficient to retain the body section against the arcuate surface. A gap detector is also affixed to the body section. Next, the apparatus drives along the fuselage, and a gap in a lap is detected and measured along the fuselage via the gap detector of the apparatus as the apparatus drives along the fuselage. These gaps are then recorded in a database.

The features, functions, and advantages that have been discussed can be achieved independently in various embodiments or may be combined in yet other embodiments further details of which can be seen with reference to the following description and drawings.

These and other advantageous features hereof will be in part apparent and in part pointed out herein below.

BRIEF DESCRIPTION OF THE DRAWINGS

For a better understanding, reference may be made to the accompanying drawings in which.

Figure 1:
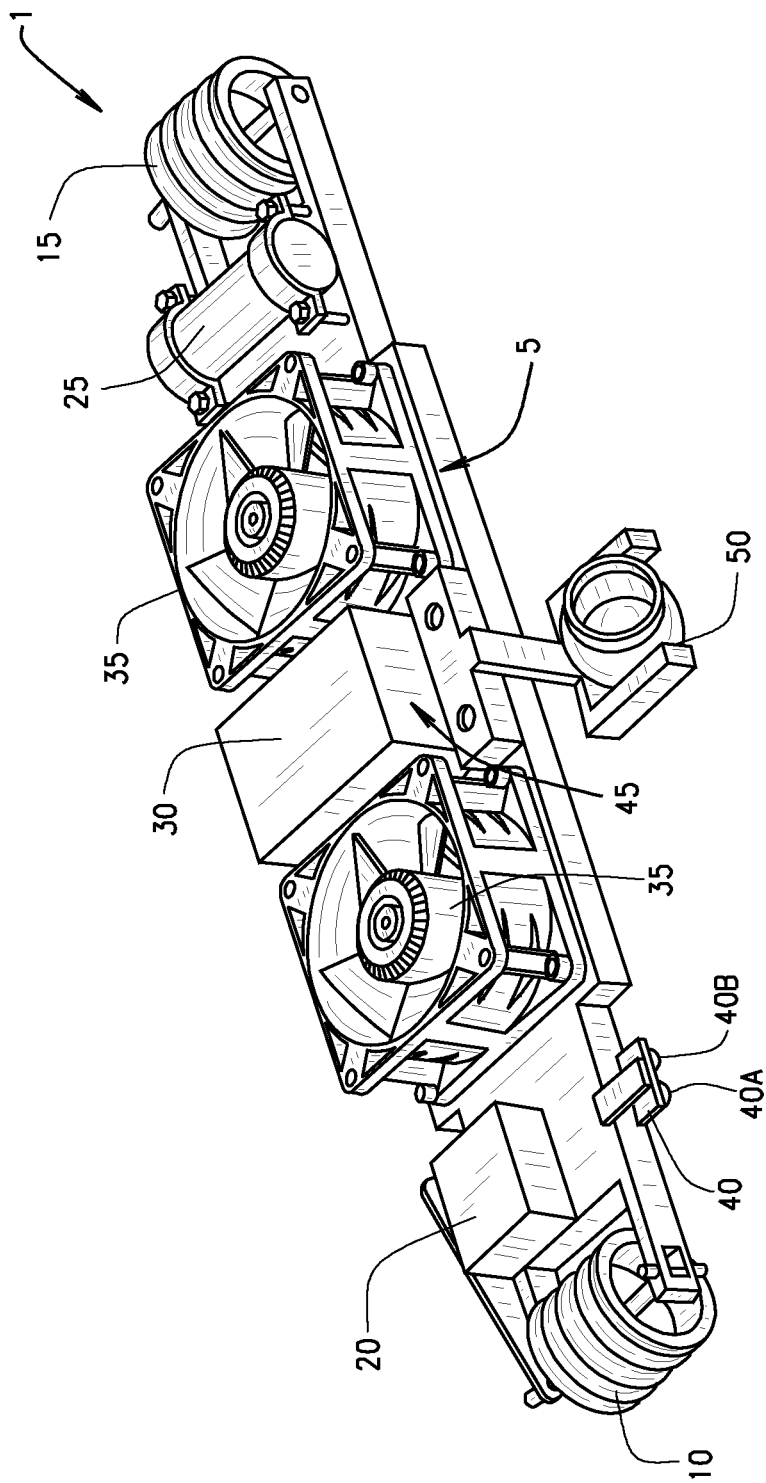
FIG. 1 is a perspective view of an example embodiment of an apparatus for measuring a circumference.

While the apparatuses and methods hereof are susceptible to various modifications and alternative forms, specific embodiments thereof are shown by way of example in the drawings and will herein be described in detail. It should be understood, however, that the drawings and detailed description presented herein are not intended to be limiting to the particular embodiment disclosed, but on the contrary, the intention is to cover all modifications, equivalents, and alternatives falling within the spirit and scope hereof as defined by the appended claims.

DESCRIPTION

According to one or more than one embodiments, various views are illustrated in FIG. 1-7 and like reference numerals are being used consistently throughout to refer to like and corresponding parts for all of the various views and figures of the drawing. Also, please note that the first digit(s) of the reference number for a given item or part should correspond to the Fig. number in which the item or part is first identified.

One embodiment teaches a novel approach for measuring a circumference. The details of various embodiments can be better understood by referring to the figures of the drawing. Referring to FIG. 1, an example of an apparatus 1 for measuring a circumference is shown. As can be seen, apparatus 1 includes a body section 5. Body section 5 may essentially be a frame which supports other components of apparatus 1. For example, at least one wheel is rotatably mounted to the body section 5. In some embodiments, a steering wheel 10 for effectuating steering of the device and a drive wheel 15 for providing propulsion of the device are rotatably attached to the body section 5. A steering mechanism, such as a steering servo 20, is also positioned on the body section 5 for causing the steering wheel 10 to turn, thereby causing steering of the apparatus 1. Similarly, a drive motor 25 is positioned on the body section 5 for causing the drive wheel 15 to rotate and thereby causing the apparatus 1 to move. It is noted that more or fewer wheels may be utilized. Similarly, any or all wheels may be a drive wheel 15 and/or a steering wheel 10.

As a non-limiting example, in another embodiment, an apparatus may include only a single wheel. A steering servo 20 and drive motor 25 may each respectively cause the single wheel to turn and rotate, thereby steering the apparatus and causing the apparatus to move via only the single wheel. Other structures for steering and propulsion are also envisioned, as would be understood by a person of ordinary skill in the art.

One or more than one battery 30 is preferably positioned on the body section 5, and is preferably in electrical communication with the drive motor 25 and/or steering servo 20, and/or any other components of apparatus 1 which require electricity to function.

At least one vacuum generating device 35 is also utilized. As shown in FIG. 1, apparatus 1 includes two vacuum generating devices 35, although it should be understood that this is merely exemplary. The one or more than one vacuum generating device 35 is preferably configured to generate an effective amount of vacuum between the body section 5 and an adjacent arcuate surface sufficient to retain the body section 5 against the arcuate surface. The one or more than one vacuum generating device 35 is preferably powered by a power source, such as a battery 30. As shown in FIG. 1, the two vacuum generating devices 35 are fans. However, this is merely exemplary. As would be understood, any other method for generating a vacuum to hold the apparatus 1 against an arcuate surface could be used. As a non-limiting example, in another embodiment, vacuum generating device 35 could include a brushless electric motor. Similarly, instead of or in addition to generating a vacuum to hold the apparatus 1 to the arcuate surface, the vacuum generating device 35 may generate an airflow which is generally perpendicular to the arcuate surface, thereby pressing the apparatus 1 against the arcuate surface. Preferably, the vacuum generating device 35 generates sufficient force to hold the apparatus 1 against the arcuate surface in any orientation, including but not limited to when the apparatus 1 is fully or partially inverted, or fully or partially vertical.

Determining an effective amount of force (T) generated by the at least one vacuum generating device 35 sufficient to retain apparatus 1 against the arcuate surface may be computed according to the following procedure. For an apparatus 1 in a fully vertical position (i.e., perpendicular to the force of gravity), the force (T) pressing the apparatus 1 laterally against the arcuate surface should be equal to the amount of lateral normal force exerted by the arcuate surface on each of the wheels. For the sake of example, an apparatus 1 with two wheels 10, 15 will be used in this example, but this number of wheels should not be considered limiting. The normal force exerted by the arcuate surface on the steering wheel 10 ($N_1$) plus the normal force exerted by the arcuate surface on the drive wheel 15 ($N_2$) should equal the force (T) generated by the at least one vacuum generating device 35: $N_1+N_2=T$ (equation 1). Additionally, the vertical frictional force between the steering wheel 10 and the arcuate surface ($F_{n1}$) combined with the vertical frictional force between the drive wheel 15 and the arcuate surface ($F_{n2}$) should be equal to the downward force on the apparatus 1 caused by the weight (w) of the apparatus 1: $F_{n1}+F_{n2}=w$ (equation 2).

It is further known that the frictional forces ($F_{n1}$, $F_{n2}$) between the two wheels 10, 15 and the arcuate surface are equal to the coefficient of static friction ($\mu_s$) multiplied by the normal forces ($N_1$, $N_2$) against the wheels 10, 15: $F_{n1}=\mu_s(N_1)$ & $F_{n2}=\mu_s(N_2)$. Substituting for $F_{n1}$ and $F_{n2}$ in equation 2 gives $\mu_s(N_1)+\mu_s(N_2)=w$. The coefficients of static friction ($\mu_s$) can then be factored out, giving $\mu_s(N_1+N_2)=w$. From equation 1, it is known that $N_1+N_2=T$. Therefore, $\mu_s(T)=w$, and $T=w/\mu_s$. As a non-limiting example, for an apparatus weighting approximately 4.101 pounds (w=4.101 pounds) and a coefficient of static friction of approximately 0.7 ($\mu_s=0.7$), it has been found that approximately 6 pounds of force generated by the at least one vacuum generating device 35 is sufficient to retain the apparatus 1 against the arcuate surface (T=4.101/0.7=5.859 pounds). An upper limit on force, such as would be so high as to prevent the apparatus 1 from moving, has not been found.

A guide mechanism 40 is also positioned on the body section 5 of apparatus 1. Guide mechanism 40 may be an ultrasonic guide mechanism or an LED-based guide mechanism, or any other appropriate type of guide mechanism. As shown in FIG. 1, guide mechanism 40 includes two sensors: first sensor 40A and second sensor 40B. The detailed functionality of guide mechanism 40 is described in detail below in connection with FIG. 3. Path or guidance information from guide mechanism 40 is transmitted to a controller 45, which is also positioned on body section 5, and which is preferably also powered by battery 30.

Controller 45 may be an integrated circuit, processor, microcontroller, microprocessor, or the like. Preferably, controller 45 is in electronic communication with steering servo 20, and is operable to transmit to steering servo 20 instructions for steering the apparatus 1. Additionally, controller 45 is preferably in electronic communication with drive motor 25 to transmit to drive motor 25 instructions for causing movement of the apparatus 1. Controller 45 is also in electronic communication with vacuum generating device 35 for providing vacuum generating device 35 instructions regarding when to operate and at what strength. Although FIG. 1 illustrates controller 45 as being a single, central component, it is noted that such decision making could be divided among several such components, and/or may be contained directly within the other components (such as steering servo 20, drive motor 25, and/or vacuum generating device 35).

A reflector 50 is preferably also positioned on the body section 5. Reflector 50 may be a spherically mounted retroreflector (SMR), or any other suitable type of reflector.

Figure 2:
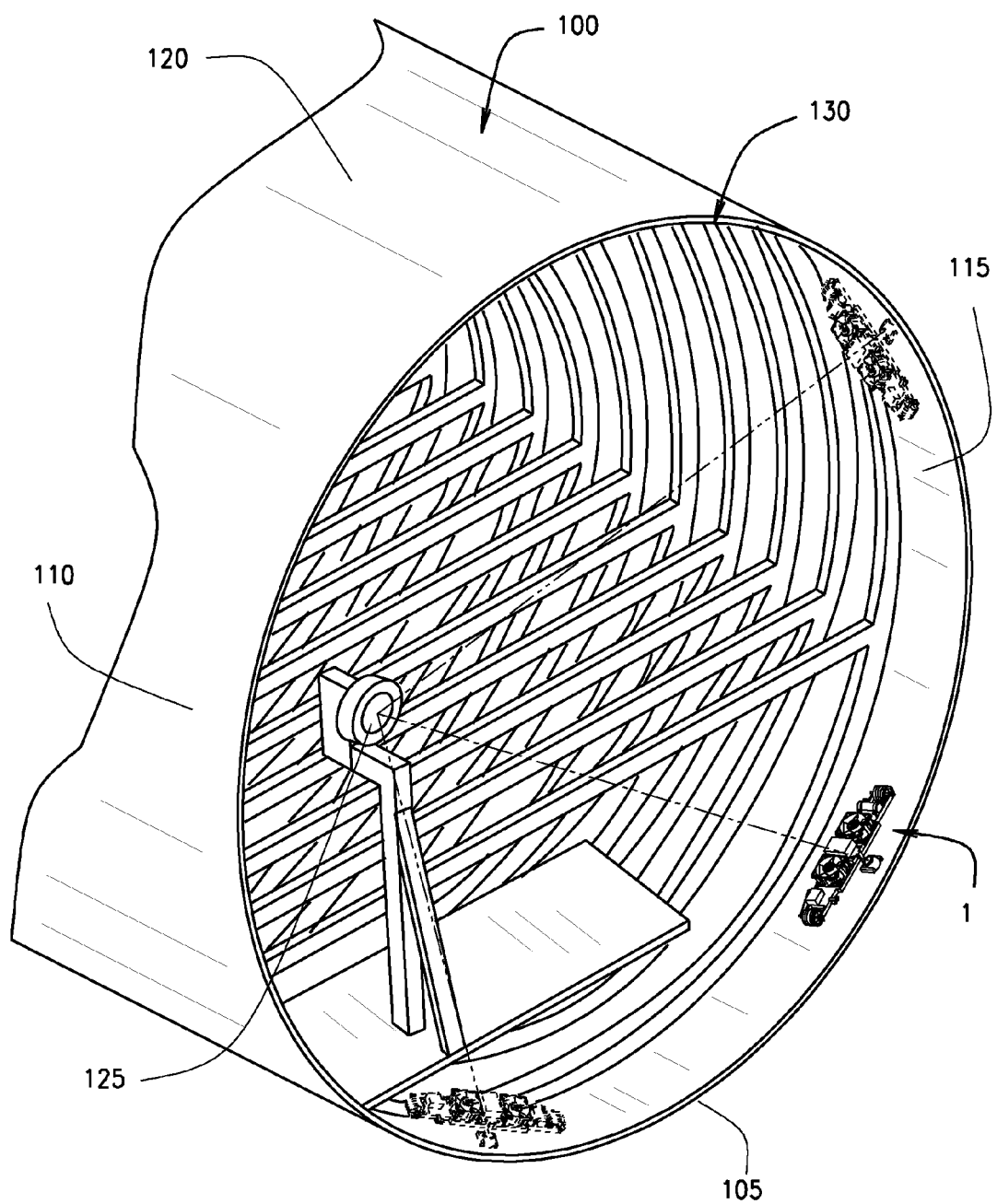
FIG. 2 is a perspective view of the apparatus of FIG. 1 on an aircraft fuselage.

FIG. 2 illustrates an apparatus 1 as placed on the inner circumference of an aircraft fuselage section 100, which may serve as the arcuate surface of which apparatus 1 measures the circumference. As discussed above, fuselage section 100 may include a keel panel 105, two side panels 110, 115, and a crown panel 120. A laser tracker 125 is preferably set up to direct a laser at reflector 50 of the apparatus 1 as the apparatus 1 traverses the circumference of the fuselage section 100. The fuselage section 100 has an edge 130, which may be used to help guide the apparatus 1 for circumnavigation around the fuselage section 100.

Figure 3:
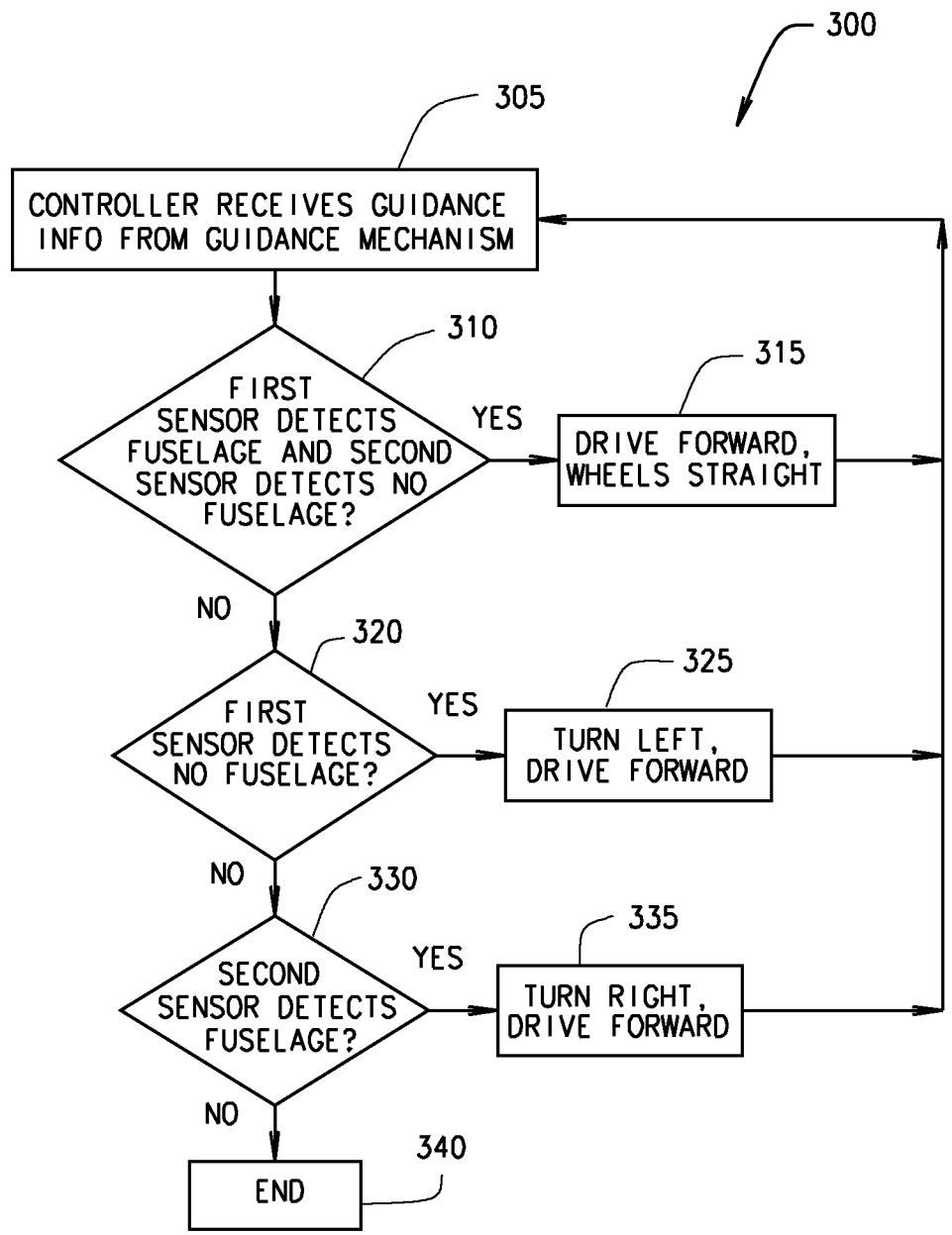
FIG. 3 is a flow diagram of example steering logic which may be used by the apparatus of FIG. 1.

An example process 300 for navigating the apparatus 1 around the fuselage section 100 by using edge 130 is illustrated in FIG. 3. At step 305, controller 45 receives guidance information from guide mechanism 40. At step 310, controller 45 makes a determination as to whether first sensor 40A detects the fuselage and second sensor 40B detects no fuselage (i.e., the edge 130 of fuselage section 100 is between the first and second sensors 40A, 40B). If so, at step 315, controller 45 instructs drive motor 25 to engage the drive wheel 15 and steering servo 20 is instructed to straighten the steering wheel 10 to cause the apparatus 1 to move straight forward. Process 300 then returns back to step 305 and restarts.

However, at step 310, if first sensor 40A does not detect fuselage or second sensor 40B does detect fuselage, the process 300 advances to step 320. Controller 45 then makes a determination as to whether first sensor 40A detects no fuselage. If no fuselage is detected, at step 325, controller 45 instructs drive motor 25 to engage the drive wheel 15 and steering servo 20 is instructed to turn the steering wheel 10 to the left, causing the apparatus 1 to drive left. Process 300 then returns back to step 305 and restarts.

At step 320, if first sensor 40A does in fact detect fuselage, the process 300 advances to step 330. Controller 45 then makes a determination as to whether second sensor 40B detects the fuselage. If the fuselage is detected by second sensor 40B, at step 335, controller 45 instructs drive motor 25 to engage the drive wheel 15 and steering servo 20 is instructed to turn the steering wheel 10 to the right, causing the apparatus 1 to drive right. Process 300 then returns back to step 305 and restarts. If, at step 330, the second sensor 40B does not detect fuselage, the controller 45 detects an error at step 340.

Of course, the left/right directions discussed herein are merely exemplary. The directions of steps 325 and 335 could be reversed without departing from the spirit hereof. Additionally, using edge 130 of fuselage section 100 to help apparatus 1 circumnavigate the fuselage section 100 is merely one possibility. Other features of fuselage section 100 could also be used as a guide, or a temporary guide line could be used, or controller 45 could simply include sufficient logic to circumnavigate the fuselage section 100 without the need for a guide mechanism 40. As a non-limiting example, in some embodiments, the position of the apparatus 1 on the inner circumference of the fuselage section 100 may be determined based on positional information acquired by a laser tracker 125 (discussed in more detail below). The controller 45 may thereby guide the movement of the apparatus 1 around the fuselage section 100 without the use of a guide mechanism 40.

Figure 4:
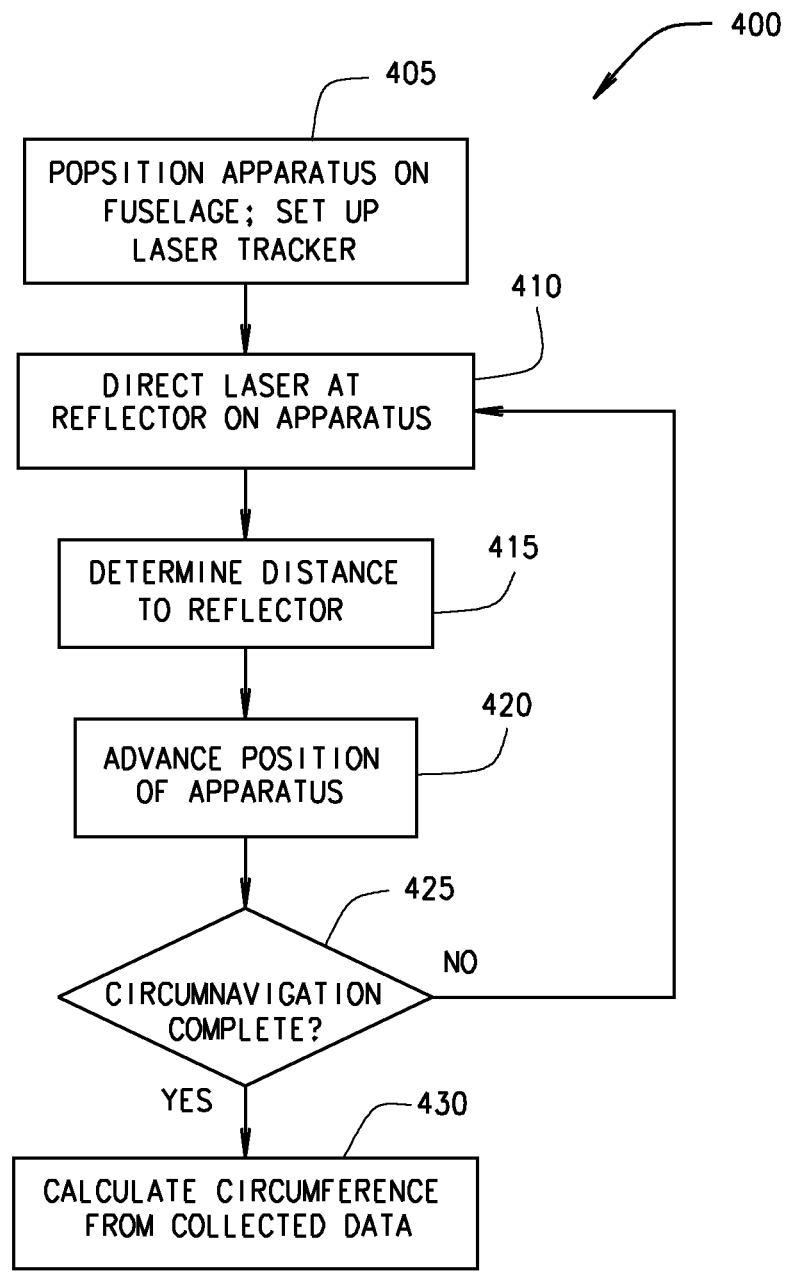
FIG. 4 is a flow diagram of an example method for measuring a circumference.

FIG. 4 illustrates a flow chart for an example method 400 for determining a circumference. At step 405, the apparatus 1 is positioned on a fuselage section 100, as discussed above. Additionally, a laser tracker 125 is positioned with respect to the fuselage section 100. As shown in FIG. 2, the laser tracker 125 may be positioned within the fuselage section 100, although this is merely exemplary.

At step 410, the laser of laser tracker 125 is directed at the reflector 50 of apparatus 1. At step 415, the reflection of the laser is received, and a determination as to the position and/or distance of the apparatus 1 with respect to the laser tracker 125 is/are determined. The apparatus 1 then moves forward at step 420, such as by the process 300 shown in FIG. 3, as a non-limiting example, and the laser of laser tracker 125 follows the reflector 50. At step 425, a determination is made as to whether the apparatus has completed its circumnavigation. If not, the process 400 reverts back to step 410 and continues. Once the apparatus 1 has completed its circumnavigation, the laser tracker 125 will have collected data of various positions and/or distances of the reflector 50 of apparatus 1 from the iterations of step 415 as the apparatus 1 moved around the fuselage section. The process 400 advances to step 430 where the collected data collected from the iterations of step 415 is used to determine the circumference of fuselage section 100 according to techniques which are known and would be understood by a person of ordinary skill of the art. For example, a spline may be fit to all of the recorded position/distance measurements, and the length of the spline may be calculated numerically.

Figure 5:
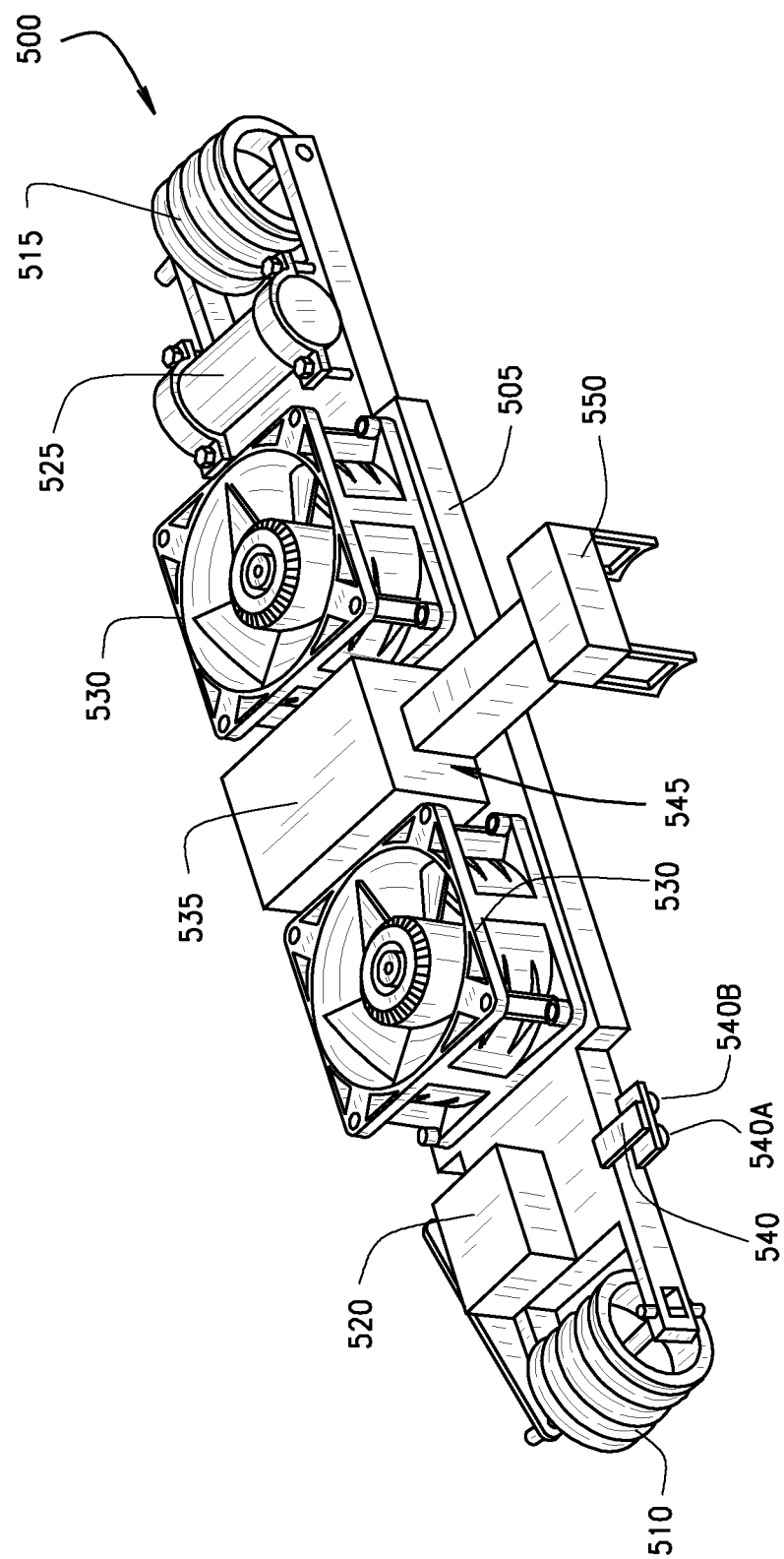
FIG. 5 is a perspective view of an example embodiment of an apparatus for measuring a lap gap.

Another embodiment of teaches a novel approach for measuring a gap. Referring to FIG. 5, an example of an apparatus 500 for measuring a gap is shown. As can be seen, apparatus 500 is, in many respects, similar to apparatus 1 shown above. As discussed in detail above in connection with apparatus 1, apparatus 500 includes a body section 505, at least one wheel (shown in FIG. 5 as a steering wheel 510 and drive wheel 515), steering servo 520, drive motor 525, at least one vacuum generating device 530, battery 535, guidance mechanism 540, and controller 545. These components will not be discussed again in detail here. However, whereas apparatus 1 in FIG. 1 included a reflector 50, apparatus 500 in FIG. 5 includes a gap detector 550. Gap detector 550 may be gap detecting mechanism as is known in the art, but in at least one embodiment, the gap detector 550 may be a laser gap detector. As would be understood, in operation, a laser gap detector 550 directs a laser at a surface, and detects the laser's reflection. By monitoring the reflection for changes (e.g., changes which would result from a gap between sections of a fuselage), the laser gap detector 550 is capable of detecting changes in the surface (e.g., gaps).

Figure 6:
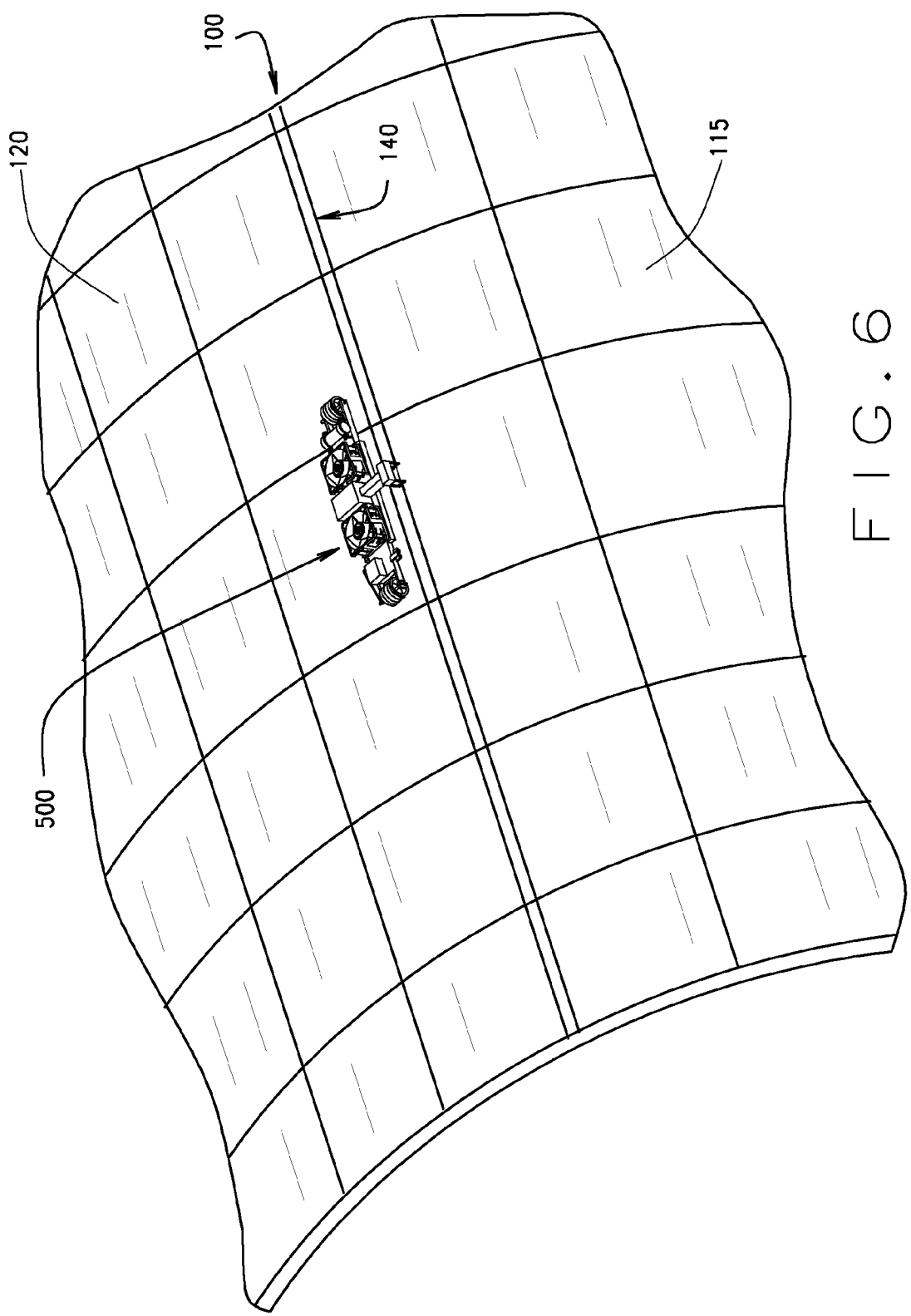
FIG. 6 is a perspective view of the apparatus of FIG. 5 on an aircraft fuselage.

FIG. 6 illustrates apparatus 500 as positioned on a fuselage section 100. As shown, two fuselage panels—side panel 115 and crown panel 120—are shown connected together at lap 140. Apparatus 500 is positioned on fuselage section 100 so that gap detector 550 is located over lap 140. In operation, apparatus 500 drives along lap 140 and determines the size of any gaps thereof. It is noted that apparatus 500 may detect gaps in connection points other than those shown in FIG. 6. For example, gaps in laps between any adjoined panel sections 105-120 could be gauged, or gaps between adjoined adjacent fuselage sections 100 could also be gauged. In such situations, apparatus 500 may circumnavigate the fuselage sections 100 on either the inside or outside thereof.

Figure 7:
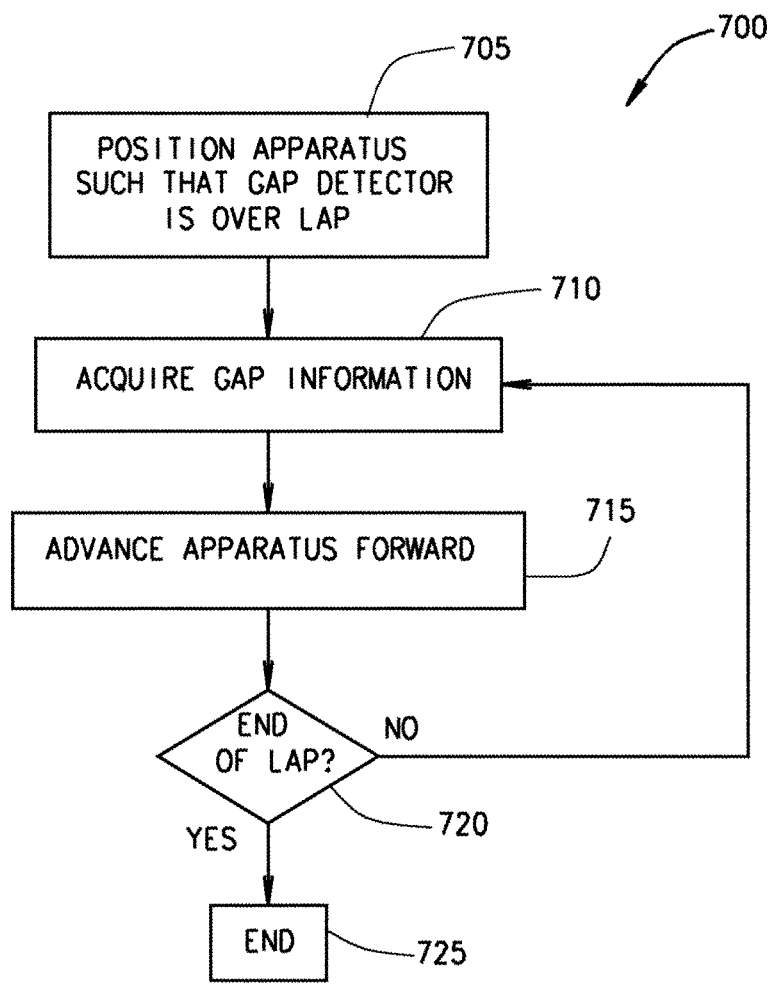
FIG. 7 is a flow diagram of an example method for measuring a lap gap.

FIG. 7 illustrates a flow chart for an example method 700 for gauging gaps. At step 705, apparatus 500 is positioned such that gap detector 550 is located over a lap. At step 710, the gap detector 550 is used to acquire gap information regarding the lap at that position. At step 715, the apparatus 500 advances forward to the next position. This may occur according to process 300 of FIG. 3, or otherwise if an edge 130 is not available. Alternatively, gap detector 550 may be used instead of a guidance mechanism 540, such that the apparatus 500 follows the lap seam itself. At step 720, a determination is made as to whether the apparatus 500 has reached the end of the lap it was gauging. If not, the process 700 reverts back to step 710 and the process 700 continues. If so, the process 700 ends at step 725. The collected gap information may be downloaded manually from the apparatus 500, or the apparatus 500 may include hardware for transmitting the collected gap information wirelessly during operation. Such information may be recorded or stored in a database.

The various implementations and examples shown above illustrate methods and apparatuses for determining a circumference and/or for detecting gaps. A user of the present methods and devices may choose any of the above implementations, or an equivalent thereof, depending upon the desired application. In this regard, it is recognized that various forms of the subject methods and apparatuses could be utilized without departing from the spirit and scope of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Other aspects, objects and advantages hereof can be obtained from a study of the drawings, the disclosure and the appended claims.

What is claimed is:

1. An apparatus comprising:
   a body section;
   at least one wheel rotatably attached to the body section;
   at least one vacuum generating device disposed on said body section and configured to generate a vacuum force between said body section and an adjacent arcuate surface that is sufficient to retain said body section against said arcuate surface as the apparatus traverses across the arcuate surface; and
   at least one of a reflector and a gap detector positioned on the body section.

2. The apparatus of claim 1, wherein the at least one of a reflector and a gap detector is a reflector.

3. The apparatus of claim 2 wherein the reflector is a spherically mounted retroreflector.

4. The apparatus of claim 1, wherein the at least one of a reflector and a gap detector is a gap detector.

5. The apparatus of claim 4 wherein the gap detector is a laser gap detector for detecting a gap in an aircraft fuselage.

6. The apparatus of claim 1 further comprising a power source attached to the body section, wherein the at least one vacuum generating device includes a fan attached to the body and powered by the power source.

7. The apparatus of claim 1, wherein the at least one wheel is a steering wheel rotatably mounted to the body section, and the apparatus further comprises:
   a steering mechanism positioned on the body section, wherein the steering mechanism is in communication with the steering wheel and is configured to turn the steering wheel to the left and to the right relative to a direction of travel as the apparatus traverses across the arcuate surface;
   a drive wheel rotatably mounted to the body section;
   a drive motor positioned on the body section, wherein the drive motor is connected to, and configured to power, the drive wheel; and
   a controller in communication with at least said steering mechanism.

8. The apparatus of claim 7 further including a guide mechanism, wherein said guide mechanism is in communication with said controller.

9. The apparatus of claim 8 wherein the guide mechanism is an ultrasonic guide mechanism.

10. The apparatus of claim 8 wherein the guide mechanism is an LED-based guide mechanism.

11. The apparatus of claim 8 wherein the guide mechanism includes a first sensor and a second sensor.

12. The apparatus of claim 8 wherein the surface is an aircraft fuselage, and wherein said controller is operable to cause steering of the apparatus via the steering mechanism to circumnavigate the aircraft fuselage.

13. The apparatus of claim 8 wherein the surface is an aircraft fuselage, and wherein said controller is operable to cause steering of the apparatus via the steering mechanism along the aircraft fuselage.

14. The apparatus of claim 1 wherein said apparatus includes both a gap detector and a reflector.

15. A method of obtaining a fuselage circumference comprising the steps of:
   utilizing an apparatus to traverse said fuselage circumference, the apparatus including:
      a body section;
      at least one wheel rotatably attached to the body section;
      at least one vacuum generating device, wherein said at least one vacuum generating device is disposed on said body section, and wherein said vacuum generating device is configured to generate an effective amount of vacuum between said body section and an adjacent arcuate surface sufficient to retain said body section against said arcuate surface that the apparatus is configured to traverse; and
      a reflector;
   utilizing a laser tracker to direct a laser to the reflector;
   directing the laser to the reflector at a plurality of positions;
   detecting a reflection of the laser from the reflector to determine the position of the apparatus on the fuselage at the plurality of positions; and
   determining the circumference of the fuselage based on the detected reflection at the plurality of positions.

16. The method of claim 15, wherein said vacuum generating device includes at least one fan.

17. The method of claim 15, wherein said reflector is a spherically mounted retroreflector.

18. A method of detecting a gap in a lap in a fuselage comprising the steps of:
   utilizing an apparatus to navigate along said fuselage, said apparatus including:
      a body section;

at least one wheel rotatably attached to the body section;

at least one vacuum generating device disposed on said body section, wherein said vacuum generating device is configured to generate a vacuum force between said body section and an adjacent arcuate surface that is sufficient to retain said body section against said arcuate surface that the apparatus is configured to traverse; and a gap detector;

causing the apparatus to drive along the fuselage;

retaining said body section against said arcuate surface using the vacuum force generated by the vacuum generating device as the apparatus drives along the fuselage;

measuring a gap in a lap along the fuselage via the gap detector of the apparatus as the apparatus drives along the fuselage and as the body section is retained against said arcuate surface using the vacuum force generated by the vacuum generating device; and recording, in a database, the gap detected.

19. The method of claim 18, wherein said vacuum generating device includes at least one fan attached to the body section.

20. The method of claim 18, wherein said gap detector is a laser gap detector.

\* \* \* \* \*